United States Patent
Chun et al.

(10) Patent No.: US 8,644,231 B2
(45) Date of Patent: Feb. 4, 2014

(54) METHOD OF TRANSMITTING FEEDBACK MESSAGE IN WIRELESS COMMUNICATION SYSTEM

(75) Inventors: Jin Young Chun, Anyang-si (KR); Bin Chul Ihm, Anyang-si (KR); Jin Sam Kwak, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 12/679,323

(22) PCT Filed: Oct. 20, 2008

(86) PCT No.: PCT/KR2008/006189
§ 371 (c)(1),
(2), (4) Date: Mar. 22, 2010

(87) PCT Pub. No.: WO2009/051456
PCT Pub. Date: Apr. 23, 2009

(65) Prior Publication Data
US 2010/0220675 A1    Sep. 2, 2010

Related U.S. Application Data

(60) Provisional application No. 60/981,102, filed on Oct. 18, 2007, provisional application No. 60/981,516, filed on Oct. 21, 2007, provisional application No. 60/992,724, filed on Dec. 6, 2007.

(30) Foreign Application Priority Data

Feb. 26, 2008    (KR) .................. 10-2008-0017522

(51) Int. Cl.
*H04W 4/00*    (2009.01)

(52) U.S. Cl.
USPC ........... 370/329; 375/259; 375/260; 455/403; 455/422.1; 455/450

(58) Field of Classification Search
USPC .......... 370/310–350, 464, 480; 375/259–260; 455/403, 422.1, 450–454
See application file for complete search history.

(56) References Cited

U.S. PATENT DOCUMENTS

2006/0029011 A1    2/2006    Etemad et al.
2006/0098568 A1*   5/2006    Oh et al. .................. 370/206
(Continued)

FOREIGN PATENT DOCUMENTS

WO    WO 2007/108624 A2    9/2007
WO    WO 2007/112371 A1    10/2007

OTHER PUBLICATIONS

Huawei: "Bandwidth efficient UL L1/L2 control messages", 3GPP Draft; R1-071419, 3$^{rd}$ Generation Partnership Project (3GPP), Mobile Competence Centre; 650, Route Des Lucioles; F-06921 Sophia-Antipolis Cedex; France, vol. RAN WG1, No. St. Julian; 20070403, Apr. 3, 2007, XP050105361.

(Continued)

*Primary Examiner* — Charles C Jiang
(74) *Attorney, Agent, or Firm* — McKenna Long & Aldridge LLP (57) ABSTRACT

A method of transmitting a feedback message in wireless communication system is provided. The method includes selecting N best subbands of M subbands according to CQI, where both M and N are a natural number and M is larger than N, generating multiple input multiple output (MIMO) information comprising N codebook indexes and N differential CQIs and transmitting the feedback message comprising the MIMO information.

8 Claims, 5 Drawing Sheets

(56) References Cited

U.S. PATENT DOCUMENTS

| | | |
|---|---|---|
| 2006/0135169 A1 | 6/2006 | Sampath et al. |
| 2006/0171295 A1* | 8/2006 | Ihm et al. .................. 370/208 |
| 2006/0171417 A1* | 8/2006 | Ihm et al. .................. 370/474 |
| 2007/0171864 A1* | 7/2007 | Zhang et al. ............... 370/329 |
| 2007/0211657 A1 | 9/2007 | McBeath et al. |
| 2007/0223440 A1* | 9/2007 | Ho et al. ................... 370/342 |
| 2007/0242770 A1* | 10/2007 | Kim et al. .................. 375/267 |
| 2007/0248046 A1* | 10/2007 | Khan ........................ 370/329 |
| 2009/0092066 A1 | 4/2009 | Chindapol et al. |
| 2009/0092067 A1 | 4/2009 | Sudarshan et al. |
| 2009/0122884 A1* | 5/2009 | Vook et al. ................. 375/260 |
| 2009/0154588 A1* | 6/2009 | Chen et al. ................ 375/267 |
| 2009/0219865 A1* | 9/2009 | Salzer et al. ............... 370/329 |
| 2009/0258653 A1 | 10/2009 | Helvick |

OTHER PUBLICATIONS

"IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed bands and Corrigendum 1; IEEE Std 802.16e-2005 and IEEE Std 8", 802.16E-2005 and IEEE STD 802.16-2004/COR1-2005 IEEE Standard for Local and Metropolitan Area Networks Part 16: Air Interface for Fixed and Mobile Broadband Wireless Access Systems Amendment 2: Physical and Medium Access Control Layers for Combined F, Jan. 1, 2006, pp. _1-822, XP017603857.

Huawei: "Overhead reduction of Best-M based CQI reporting", 3GPP Draft; R1-063086, $3^{rd}$ Generation Partnership Project (3GPP), Mobile Competence Centre; 650, Route Des Lucioles; F-06921 Sophia-Antipolis Cedex; France, vol. RAN WG1, No. Riga, Latvia; 20061101, Nov. 1, 2006, XP050103545.

Huawei: "Uplink overhead for CQI and MIMO feedback in E-Utra", 3GPP Draft; R1-071418, $3^{rd}$ Generation Partnership Project (3GPP), Mobile Competence Centre; 650, Route Des Lucioles; F-06921 Sophia-Antipolis Cedex; France, vol. RAN WG1, No. St. Julian; 20070403, Apr. 3, 2007, XP050105360.

* cited by examiner

METHOD OF TRANSMITTING FEEDBACK MESSAGE IN WIRELESS COMMUNICATION SYSTEM

This application is a national phase application based on International Application No. PCT/KR2008/006189, filed on Oct. 20, 2008, which claims priority to U.S. Provisional Application No. 60/981,102, filed on Oct. 18, 2007, U.S. Provisional Application No. 60/981,516, filed on Oct. 21, 2007, U.S. Provisional Application No. 60/992,724, filed on Dec. 6, 2007 and Korean Patent Application No. 10-2008-0017522, filed on Feb. 26, 2008, all of which are incorporated by reference for all purposes as if fully set forth herein.

TECHNICAL FIELD

The present invention relates to a wireless communication system, and more particularly, to a method of transmitting a feedback message in a wireless communication system.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

A multiple input multiple output (MIMO) technique improves efficiency of data transmission and reception by using multiple transmit (Tx) antennas and multiple receive (Rx) antennas. Ever since the MIMO technique was introduced from the IEEE 802.16a standard, the MIMO technique has been constantly updated up to now.

The MIMO technique can be classified into a spatial multiplexing technique and a spatial diversity technique. According to the spatial multiplexing technique, different streams are simultaneously transmitted and thus data can be transmitted at a high speed without increasing a system bandwidth. According to the spatial diversity technique, same streams are transmitted through multiple Tx antennas to obtain diversity, thereby increasing data reliability.

Hereinafter, a downlink denotes a communication link from a base station (BS) to a mobile station (MS), and an uplink denotes a communication link from the MS to the BS.

In general, the BS schedules uplink and downlink radio resources in a wireless communication system. The radio resources are used for data transmission in the wireless communication system. For example, timeslots are resources in a time division multiple access (TDMA) system. Codes and timeslots are resources in a code division multiple access (CDMA) system. Subcarriers and timeslots are resources in an orthogonal frequency division multiple access (OFDMA) system. The respective resources can be defined to be orthogonal in a time, code, or frequency domain, so that interference does not occur to other users in the same cell or sector.

The MS can transmit a feedback message through uplink. The feedback message includes channel information required for data transmission. By using the feedback message received from the MS, the BS can schedule a radio resource and can transmit data. A closed-loop mode is a mode in which data is transmitted by compensating for channel information included in the feedback message received from the MS. An open-loop mode is a mode in which data is transmitted without compensating for the channel information included in the feedback message received from the MS. The feedback message may not be transmitted in the open-loop mode. Even if the feedback message is transmitted, the BS may not use the channel information included in the feedback message. Generally, in the communication system, the open-loop mode can be used in a channel environment where the MS moves with a high speed, and the closed-loop mode can be used in a channel environment where the MS moves with a slow speed. More specifically, the open-loop mode is used when the MS moves with a high speed since a channel variation is significant and thus channel information included in feedback message is unreliable. In addition, the closed-loop mode is used when the MS moves with a slow speed since a channel variation is relatively less significant and thus the channel information included in the feedback message is reliable and is less sensitive to delay.

Examples of the feedback message transmitted by the MS may include a scheduling request that requests radio resource allocation such as a bandwidth request (BR), an acknowledgment (ACK)/negative-acknowledgment (NACK) signal that is a response for downlink data transmission, a channel quality indicator (CQI) that indicates downlink channel quality or MIMO information, etc.

However, when the MS generates and transmits independent feedback messages for the respective types of information (e.g., CQI, MIMO, etc.), many overheads are caused by limited radio resources. Therefore, there is a need for a method of effectively transmitting a feedback message by combining different types of channel information.

DISCLOSURE OF INVENTION

Technical Problem

The present invention provides a method of transmitting a feedback message including a variety of feedback information.

Technical Solution

In one aspect, a method of transmitting a feedback message is provided. The method includes selecting N best subbands of M subbands according to CQI, where both M and N are a natural number and M is larger than N, generating multiple input multiple output (MIMO) information comprising N codebook indexes and N differential CQIs, wherein a codebook index indicates an index for a codebook used for each of the N best subbands and a differential CQI indicates difference between a reference CQI and a CQI for each of the N best subbands and transmitting the feedback message comprising the MIMO information.

In another aspect, a mobile station (MS) comprising a radio frequency (RF) unit for transmitting and receiving a radio signal and a processor coupled with the RF unit and configured to select N best subbands of M subbands according to CQI, where both M and N are a natural number and M is larger than N, generate MIMO information comprising N codebook indexes and N differential CQIs, wherein a codebook index indicates an index for a codebook used for each of the N best subbands and a differential CQI indicates difference between a reference CQI and a CQI for each of the N best subbands and transmit the feedback message comprising the MIMO information is provided.

Advantageous Effects

A feedback message can be effectively transmitted by combining different types of channel information, thereby reducing an overhead.

MODE FOR THE INVENTION

A technique to be described below can be used in various wireless communication systems. The wireless communication systems can be widely deployed to provide a variety of communication services, such as voices, packet data, etc. The technique may be used in downlink or uplink. In general, the downlink is defined as a communication link from a base station (BS) to a mobile station (MS), and the uplink is defined as a communication link from the MS to the BS. The BS is generally a fixed station that communicates with the MS and may be referred to as another terminology, such as a node-B, a base transceiver system (BTS), an access point, etc. The MS may be fixed or mobile, and may be referred to as another terminology, such as a user equipment (UE), a user terminal (UT), a subscriber station (SS), a wireless device, etc.

Figure 1:
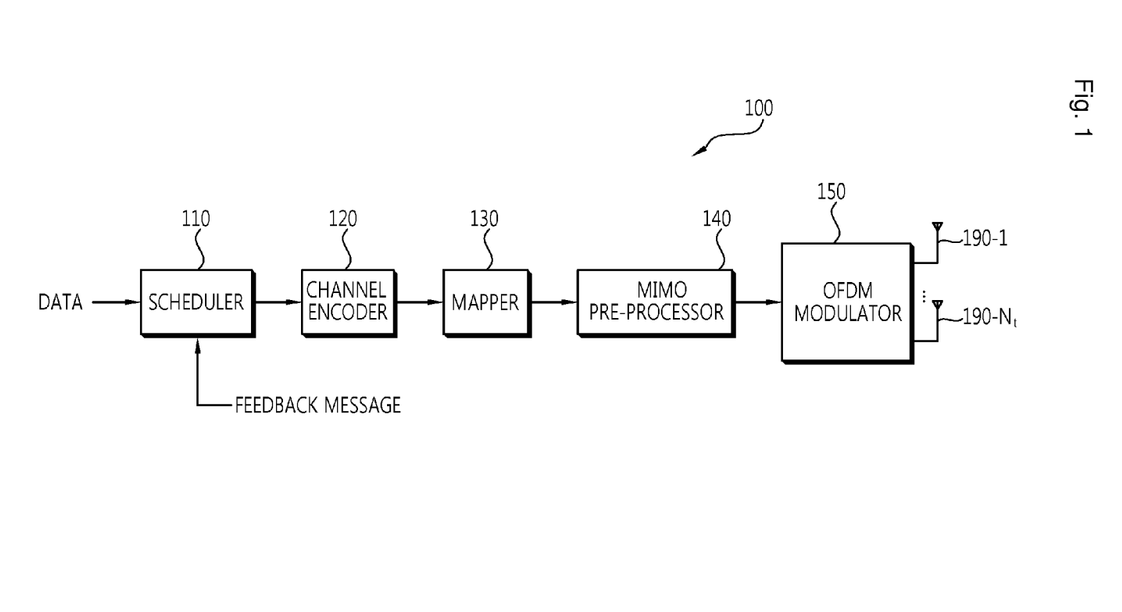
FIG. 1 is a block diagram showing a transmitter having multiple antennas.

FIG. 1 is a block diagram showing a transmitter having multiple antennas.

Referring to FIG. 1, a transmitter 100 includes a scheduler 110, a channel encoder 120, a mapper 130, a multiple input multiple output (MIMO) pre-processor 140, an orthogonal frequency division multiplexing (OFDM) modulator 150, and Nt (Nt≥1) transmit (Tx) antennas 190-1, . . . , 190-Nt. The transmitter 100 may be a part of a BS in downlink.

The scheduler 110 allocates radio resources, and schedules data transfer format, power, transfer rate, etc. When in a closed-loop mode, the scheduler 110 uses a feedback message. When in an open-loop mode, the scheduler 110 can perform scheduling without using the feedback message. For example, among permutation schemes, adaptive modulation and coding (AMC) can use the closed-loop mode, and full usage of subchannels (FUSC) or partial usage of subchannels (PUSC) can use the open-loop mode.

The channel encoder 120 generates coded data by performing encoding according to a predetermined coding scheme. The mapper 130 maps the coded data to a symbol representing a location on a signal constellation. This is called a data symbol. There is no restriction on a modulation scheme of the mapper 130. The modulation scheme may be m-phase shift keying (m-PSK) or m-quadrature amplitude modulation (m-QAM).

The MIMO pre-processor 140 processes the input data symbol according to a MIMO scheme depending on the Tx antennas 190-1, . . . , 190-Nt. For example, a plurality of Tx antennas may be grouped (i.e., antenna grouping) or a part of the Tx antennas may be selected (i.e., antenna selection). In addition, codebook-based precoding may be performed.

The OFDM modulator 150 outputs an OFDM symbol by performing OFDM modulation on the input symbol. The OFDM modulator 150 can perform inverse fast Fourier transform (IFFT) on the input symbol. Further, after performing IFFT, the OFDM modulator 150 can insert a cyclic prefix (CP) to the OFDM symbol. The OFDM symbol is transmitted through each of the Tx antennas 190-1, . . . , 190-Nt.

Figure 2:
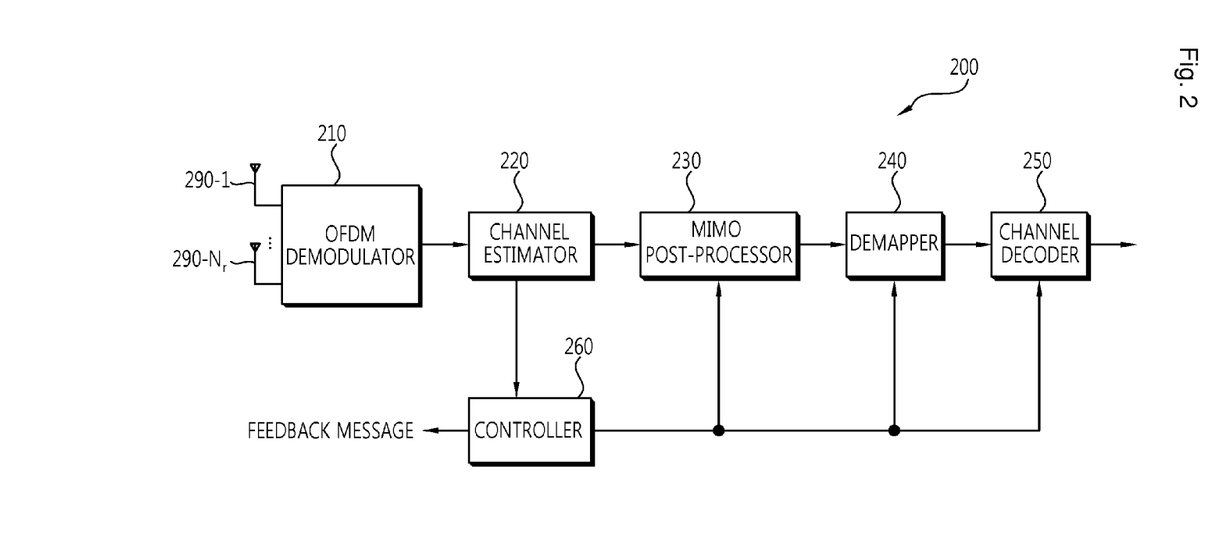
FIG. 2 is a block diagram showing a receiver having multiple antennas.

FIG. 2 is a block diagram showing a receiver having multiple antennas.

Referring to FIG. 2, a receiver 200 includes an OFDM demodulator 210, a channel estimator 220, a MIMO post-processor 230, a demapper 240, a channel decoder 250, a controller 260, and Nr (Nr≥1) receive (Rx) antennas 290-1, . . . , 290-Nr. The receiver 200 may be a part of an MS in downlink.

The OFDM demodulator 210 performs fast Fourier transform (FFT) on signals received through the Rx antennas 290-1, . . . , 290-Nr. The channel estimator 220 estimates a channel. The MIMO post-processor 230 performs post-processing corresponding to the pre-processing of the MIMO pre-processor 140 (see FIG. 1). The demapper 240 demaps the input symbol to coded data. The channel decoder 250 restores original data by decoding the coded data.

The controller 260 generates a feedback message by using channel information estimated by the channel estimator 220, and feeds back the feedback message to the transmitter 100 (see FIG. 1).

The feedback message may include a scheduling request that requests radio resource allocation such as a bandwidth request (BR), an acknowledgment (ACK)/negative-acknowledgment (NACK) signal that is a response for downlink data transmission, a channel quality indicator (CQI) that indicates downlink channel quality or MIMO information, etc.

Example of the CQI may be a signal-to-noise ratio (SNR), a signal-to-interference-and-noise ratio (SINR), a carrier-to-interference-and-noise ratio (CINR), a modulation coding scheme (MCS) level, a data rate indicator or a received signal strength indicator (RSSI), etc.

Examples of the MIMO information include a rank, an antenna grouping index, an antenna selection index or a codebook index, etc. The rank denotes the number of independent channels in the MIMO system. The rank may be defined as the number spatial streams that can be multiplexed.

Figure 3:
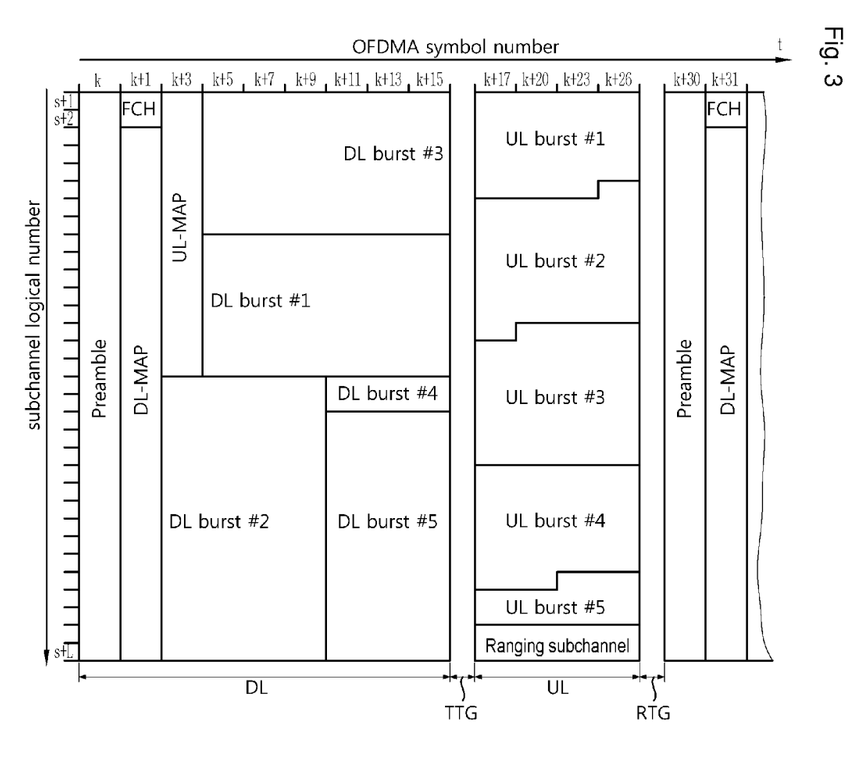
FIG. 3 shows an exemplary structure of a frame.

FIG. 3 shows an exemplary structure of a frame. The frame is a data sequence used according to a physical specification in a fixed time duration. This may be found in clause 8.4.4.2 of "Part 16: Air Interface for Fixed Broadband Wireless Access Systems" in the IEEE standard 802.16-2004.

Referring to FIG. 3, the frame includes a downlink (DL) frame and an uplink (UL) frame. In time division duplex (TDD) mode, UL and DL transmissions share the same frequency band but are performed in different time durations. The DL frame is temporally prior to the UL frame. The DL frame sequentially includes a preamble, a frame control header (FCH), a DL-MAP, a UL-MAP, and a DL burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

The preamble is used between a BS and an MS for initial synchronization, cell search, and frequency-offset and channel estimation. An FCH includes information regarding a length of a DL-MAP message and a coding scheme of the DL-MAP.

The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message.

The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of uplink allocation defined by the UL-MAP. The UCD describes a UL burst profile. The UL burst profile indicates characteristics of a UL physical channel. The UCD is periodically transmitted by the BS by using a UCD message.

The DL burst is a region for transmitting data from the BS to the MS. The UL burst is a region for transmitting data from the MS to the BS.

A fast feedback region may be included in the UL frame. The fast feedback region is allocated for fast uplink transmission. A feedback message can be carried on the fast feedback region.

Hereinafter, a slot is a minimum unit of possible data allocation, and is defined with a time and a subchannel. The number of subchannels depends on an FFT size and time-frequency mapping. Each subchannel includes a plurality of subcarriers. The number of subcarriers included in each subchannel differs according to a permutation scheme. Permutation denotes mapping from a logical subchannel to a physical subcarrier. In full usage of subchannels (FUSC), each subchannel includes 48 subcarriers. In partial usage of subchannels (PUSC), each subchannel includes 24 or 16 subcarriers.

In order for data to be mapped onto physical subcarriers in a physical layer, the data is generally subjected to two steps. In a first step, the data is mapped to at least one data slot on at least one logical subchannel. In a second step, each logical subchannel is mapped to a physical subcarrier. Examples of the permutation scheme employed in the IEEE 802.16-2004 standard include FUSC, PUSC, optional-FUSC (O-FUSC), optional-PUSC (O-PUSC), adaptive modulation and coding (AMC), etc. A set of orthogonal frequency division multiple access (OFDMA) symbols using the same permutation scheme is referred to as a permutation zone. One frame includes at least one permutation zone.

The FUSC and the O-FUSC are used only in downlink transmission. Each subchannel is mapped to a physical subcarrier distributed over the entire physical channel. This mapping varies for each OFDMA symbol. The O-FUSC uses a pilot allocation scheme different from that used in the FUSC.

The PUSC is used both in downlink transmission and uplink transmission. In downlink, each physical channel is divided into clusters, each of which includes 14 contiguous subcarriers on two OFDMA symbols. The physical channel is mapped to six groups. In each group, pilots are allocated in fixed positions to each cluster. In uplink, subcarriers are divided into tiles, each of which includes four contiguous physical subcarriers on three OFDMA symbols. The subchannel includes six tiles. Pilots are allocated to the corners of each tile. The O-PUSC is used only in uplink transmission. Each tile includes three contiguous physical subcarriers on three OFDMA symbols. Pilots are allocated at the center of each tile.

The AMC is used both in downlink transmission and uplink transmission. A physical AMC band includes a bin. The bin includes nine contiguous subcarriers on one OFDMA symbol. The physical AMC band denotes a group of four rows of the bin. An AMC logical band is a group of physical AMC bands. 12 AMC logical bands are used for a bandwidth of 5 MHz. An AMC subchannel includes six contiguous bins within the same logical band. Eight data subcarriers and one pilot subcarrier are allocated to the bin.

Although a TDD-based frame has been exemplified herein, the technical features of the present invention are not limited thereto. Thus, the present invention can also apply to a frame based on frequency division duplex (FDD) mode, in which uplink transmission and downlink transmission are frequency-divided, or half duplex FDD (H-FDD) mode.

Figure 4:
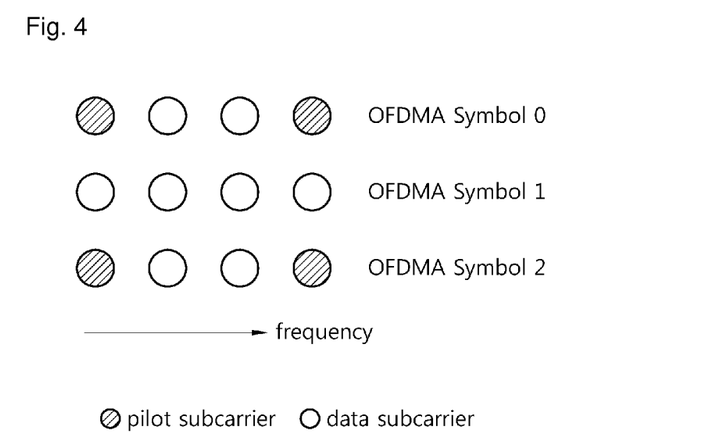
FIG. 4 shows an exemplary structure of a tile when a partial usage of subchannel (PUSC) permutation is used.

FIG. 4 shows an exemplary structure of a tile when a PUSC permutation is used.

Referring to FIG. 4, a tile includes four contiguous physical subcarriers on three OFDMA symbols. Eight data subcarriers and four pilot subcarriers are allocated to the tile. The pilot subcarriers are allocated to the corners of the tile.

Now, a configuration of a feedback message will be described. The feedback message may include MIMO information and a CQI for indicating a physical characteristic of a downlink channel. An optimal throughput can be obtained when the CQI or the MIMO information are fed back for all subcarriers in a frequency domain. However, since an amount of radio resources allocated to a feedback channel increases in this case, a data rate may be limited. Therefore, the CQI or the MIMO information is measured or determined in a unit of band including a plurality of subcarriers.

Figure 5:
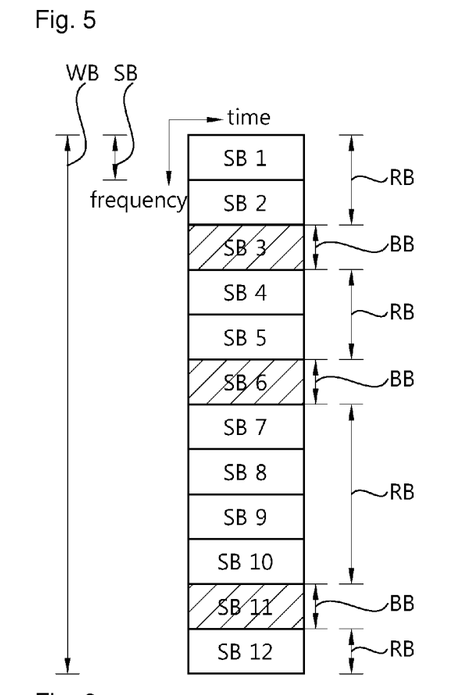
FIG. 5 shows an example of a frequency band.

FIG. 5 shows an example of a frequency band.

Referring to FIG. 5, a whole band (WB) denotes a whole frequency band and is divided into a plurality of subbands (SBs). Each subband is indicated by an 'SBn', where n denotes an index of each subband. The WB can be divided into 12 SBs. However, the number of SBs is not limited thereto, and thus the WB may be divided into more (or less) than 12 SBs.

Hereinafter, a best-N method denotes a method in which N specific SBs are selected from a plurality of SBs. For example, N SBs having best channel conditions may be selected. A best band (BB) denotes the selected N SBs. A remaining band (RB) denotes SBs remaining after excluding the BB from the WB. For example, in FIG. 5, an SB3, an SB6, and an SB11 are selected as the BB according to a best-3 method.

The CQI can be obtained for each SB. In addition, a codebook index included in the MIMO information also can be obtained for each SB. An SB for obtaining the codebook index is not necessarily to coincide with an SB for obtaining the CQI. For example, the number of subcarriers included in an SB used to obtain the MIMO information may be greater than the number of subcarriers included in an SB used to obtain the CQI.

The feedback message may include the CQI obtained for each SB in a format such as a best-N CQI, a best-N differential CQI, a whole band average CQI or a remaining band average CQI. The best-N CQI is a CQI for the selected N SBs, that is, for each BB. The best-N differential CQI is a difference value between the CQI for each BB and a reference CQI. For example, the reference CQI may be a best-N average CQI, a remaining band average CQI or a whole band CQI, etc. The reference CQI may be transmitted in the feedback message. Alternatively, the reference CQI may be transmitted before the feedback message is transmitted. The reference CQI may be a previously transmitted best-N CQI or best-N differential CQI. The best-N average CQI is an average CQI for BBs. The whole band average CQI is an average CQI for the WB. The RB average CQI is an average CQI of all SBs belonging to the RB.

In addition, the feedback message may include the codebook index obtained for each SB in a format such as a best-N codebook index, a best-N average codebook index, a whole band average codebook index or a remaining band average codebook index. The best-N codebook index is a codebook index for the selected N SBs, that is, for each BB. The best-N average codebook index is an average codebook index for BBs. The whole band average codebook index is an average codebook index for the WB. The remaining band average codebook index is an average codebook index for all SBs belonging to the RB.

If N BBs are selected in the best-N method, an indication bitmap may be used to indicate the selected N SBs. The indication bitmap indicates N SBs selected from a plurality of SBs in the best-N method. For example, if the WB is divided into 12 SBs, the SB1 to the SB12 may be expressed by respective bits, and the selected SBs may be expressed by '1'. In this case, the size of the indication map is fixed to 12. As shown in FIG. 5, if the SB3, the SB6, and the SB11 are selected in the best-3 method, the indication bitmap may be indicated by '0b0010 0100 0010'. In addition, the size of the indication bitmap may be ceiling ($\log_2(_{12}C_N)$). Herein, ceiling(•) is a ceiling function, and is a smallest integer greater than or equal to (•). $_{12}C_N$ denotes the number of cases for selecting N elements out of 12 elements. If N=4, the indication bitmap has a size of 9 bits. If N=5, the indication bitmap has a size of 10 bits.

The aforementioned manner of dividing the WB into SBs is for exemplary purposes only. Thus, the number of SBs and the size of each SB may vary.

As such, various SBs are used to reduce an overhead caused by the feedback message so that smooth communication is achieved between a BS and an MS. In addition, the various SBs are used to effectively transmit the feedback message.

Figure 6:
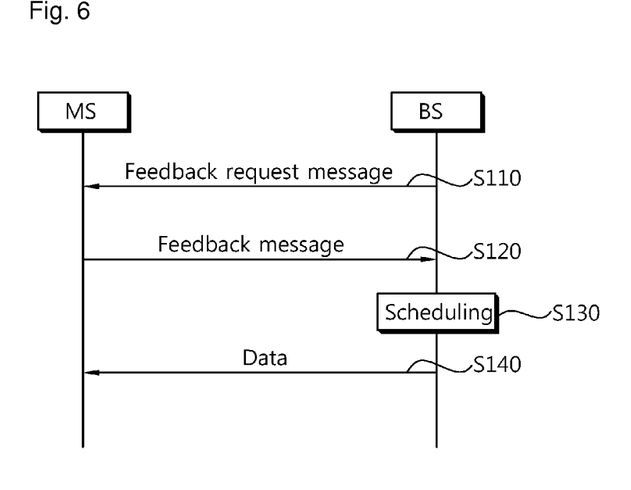
FIG. 6 is a flow diagram showing a method of transmitting a feedback message according to an embodiment of the present invention.

FIG. 6 is a flow diagram showing a method of transmitting a feedback message according to an embodiment of the present invention.

Referring to FIG. 6, a BS transmits a feedback request message to an MS (step S110). To schedule the feedback message transmitted by the MS, the feedback request message may include an uplink radio resource allocation and a feedback type. The uplink radio resource allocation may include a variety of information such as a feedback message transmission period, a frame offset, an OFDMA symbol offset, a subchannel offset, etc. The feedback type indicates a type of the feedback message to be reported by the MS. Examples of the feedback type include a CQI feedback, a MIMO feedback, a physical (PHY) layer channel feedback, etc. For example, the feedback request message may use a feedback polling message, a feedback request extended sub-header, a CQI channel (CQICH) allocation message, or a CQICH enhanced allocation message. The feedback polling message is included in a UL-MAP message when transmitted. The feedback request extended sub-header is included in a medium access control (MAC) sub-header when transmitted. A feedback header is used for feedback of the feedback polling message. A fast feedback channel is used for feedback of the CQICH allocation message or the CQICH enhanced allocation message.

The MS transmits the feedback message to the BS (step S120). By using the uplink radio resource to be indicated by the feedback request message, the MS transmits the feedback message which includes the feedback type to be indicated by the feedback request message.

Alternatively, the MS can transmit the feedback message without reception of the feedback request message. In this case, the MS can transmit the feedback message by using an existing uplink radio resource, or the MS can request an allocation of an uplink radio resource for transmitting the feedback message to the BS.

The feedback message may include a feedback type field and a feedback contents field. The feedback type field indicates a type of information contained in the feedback contents field. The feedback type field corresponds to the feedback type included in the feedback request message. The feedback contents field includes feedback information. For example, the feedback message may use a feedback header. The feedback header is included in a MAC header when transmitted.

Hereinafter, a method of simultaneously transmitting a CQI and MIMO information by using a feedback message will be described. Table 1 shows an example of the feedback message.

TABLE 1

| Feedback type (4 bits) | Feedback contents (16 or 32 bits) | Description |
| --- | --- | --- |
| 1110 or 1111 | CL MIMO type (2 bits)<br>If (CL MIMO type == 0b00) {<br>    Antenna grouping index (4 bits) +<br>    average CQI (5 bits)<br>}<br>Else if (CL MIMO type == 0b01) {<br>    Number of streams (2 bits) +<br>Antenna<br>    selection option index (3 bits) +<br>average CQI (5 bits) of the selected<br>antennas<br>} | Closed-loop MIMO feedback<br>CL MIMO type:<br>0b00: antenna grouping<br>0b01: antenna selection<br>0b10: codebook<br>0b11: indication of transition from closed-loop MIMO to open-loop MIMO |

TABLE 1-continued

| Feedback type (4 bits) | Feedback contents (16 or 32 bits) | Description |
|---|---|---|
| | Else if (CL MIMO type == 0b10) { Number of streams (2 bits) + MIMO info. } | |

The feedback type field indicates contents of the feedback contents field. It is assumed herein that the size of the feedback type field is 4 bits, and the value of the feedback type field is '0b1110' or '0b1111'.

The CQI and the MIMO information are included in the feedback contents field. A type of information included in the feedback contents field can be classified according to a closed-loop (CL) MIMO type. When 2 bits are used to indicate the CL MIMO type, 4 CL MIMO types can be expressed. Examples of the CL MIMO type include antenna grouping, antenna selection, codebook, etc.

If the CL MIMO type is '0b00', the feedback message includes an antenna grouping index and an average CQI. The antenna grouping index indicates a method of grouping Tx antennas by the BS. The size of the antenna grouping index may be 4 bits. It is assumed hereinafter that the antenna grouping index is '0b0000'. When the BS has three Tx antennas, an antenna 0 and an antenna 1 may be grouped for a first subcarrier and also the antenna 1 and an antenna 2 may be grouped for a second subcarrier. When the BS has four Tx antennas, the antenna 0 and the antenna 1 may be grouped for the first subcarrier and also the antenna 2 and an antenna 3 may be grouped for the second subcarrier. The average CQI is an average CQI for a whole band (WB).

If the CL MIMO type is '0b01', the feedback message includes the number of streams, an antenna selection option index, and an average CQI of the selected antennas. The number of streams denotes the number of streams that can be simultaneously transmitted through multiple antennas. The antenna selection option index indicates a method of selecting a Tx antenna by the BS. The size of the number of streams may be 2 bits. The size of the antenna selection option index may be 3 bits. For example, if the number of streams is '0b10' and the antenna selection option index is '0b000', the BS may select the antenna 1 and the antenna 2.

If the CL MIMO type is '0b10', the feedback message includes the number of streams and the MIMO information (simply MIMO info.). The number of streams denotes the number of streams that can be simultaneously transmitted through the multiple antennas. Although the size of the number of streams is 2 bits in Table 1 above, the size of the number of streams is not limited thereto. The MIMO information indicates a downlink channel condition in association with the multiple antennas, and may include a CQI and a codebook index.

If the CL MIMO type is '0b11', it indicates a change from the CL MIMO to an open-loop MIMO. In this case, the feedback message may not include other feedback information except for the CL MIMO type.

The BS schedules a transfer format, power, a transfer rate, etc., by using the received feedback message (step S130). The BS transmits data processed through the determined transfer format, power, transfer rate, etc., to the MS (step S140). Since the closed-loop mode is used, when transmitting the data, the BS compensates for channel information by using the feedback message.

Now, an example of configuring the MIMO information included in the feedback message when the CL MIMO type is '0b10' will be described. If the size of the feedback contents field is 32 bits, the size of the CL MIMO type is 2 bits and the size of the number of streams is represented in 2 bits. Thus, the CQI and the codebook index are combined so that the size of the MIMO information is less than 28 bits.

(1) First Embodiment

The MIMO information includes a best-N codebook index. N subbands (SBs) are selected from a plurality of SBs constituting a whole band (WB). The codebook index for each of the selected N SBs is transmitted. If the size of the codebook index is 6 bits, the MIMO information has a size of N*6 bits. If the size of the codebook index is 3 bits, the MIMO information has a size of N*3 bits.

(2) Second Embodiment

The MIMO information includes a best-N codebook index and a best-N differential CQI. N SBs are selected from a plurality of SBs constituting a WB. The codebook index for each of the selected N SBs and the differential CQI for each of the selected N SBs are transmitted. If the size of the codebook index is 3 bits, the best-N codebook index has a size of N*3 bits. If the size of the differential CQI for one SB is 2 bits, the best-N differential CQI has a size of N*2 bits.

(3) Third Embodiment

The MIMO information includes a best-N average codebook index, a best-N average CQI, a whole band average CQI (or a remaining band average CQI), and a whole band average codebook index (or a remaining band average codebook index). The whole band average CQI (or the remaining band average CQI) and the whole band average codebook index (or the remaining band average codebook index) imply the following four cases: the whole band average CQI and the whole band average codebook index; the whole band average CQI and the remaining band average codebook index; the remaining band average CQI and the whole band average codebook index; and the remaining band average CQI and the remaining band average codebook index. N SBs are selected from a plurality of SBs constituting a WB. The average codebook index for the selected N SBs, the average CQI for the selected N SBs, the average CQI for the WB (or the average CQI for SBs excluding the selected N SBs from the WB), and the average codebook index for the WB (or the average codebook index for SBs excluding the selected N SBs from the WB) are transmitted. If the size of the codebook index is 6 bits, the best-N average codebook index and a whole band average codebook index (or the remaining band average codebook index) each has a size of 6 bits. If the size of the codebook index is 3 bits, the best-N average codebook index and the whole band average codebook index (or the remaining band average codebook index) each has a size of 3 bits. If the size of the CQI is 5 bits, the best-N average CQI and the whole band average CQI (or the remaining band average CQI) each has a size of 5 bits.

(4) Fourth Embodiment

The MIMO information includes a best-N average codebook index and a best-N differential CQI. N SBs are selected from a plurality of SBs constituting a WB. The average codebook index for the selected N SBs and the differential CQI for each of the selected N SBs are transmitted. If the size of the codebook index is 6 bits, the best-N average codebook index has a size of 6 bits. If the size of the codebook index is 3 bits, the best-N average codebook index has a size of 3 bits. If the size of the differential CQI for one SB is 1 to 3 bits, the best-N differential CQI has a size of N*(1 to 3) bits.

(5) Fifth Embodiment

The MIMO information includes a best-N average codebook index, a best-N differential CQI, a whole band average CQI (or a remaining band average CQI), and a whole band average codebook index (or a remaining band average codebook index). The whole band average CQI (or the remaining band average CQI) and the whole band average codebook index (or the remaining band average codebook index) imply the four cases which are the same as those described in the third embodiment. N SBs are selected from a plurality of SBs constituting a WB. The average codebook index for the selected N SBs, the differential CQI for each of the selected N SBs, the average CQI for the WB (or the average CQI for SBs excluding the selected N SBs from the WB), and the average codebook index for the WB (or the average codebook index for SBs excluding the selected N SBs from the WB) are transmitted. If the size of the codebook index is 6 bits, the best-N average codebook index and the whole band average codebook index (or the remaining band average codebook index) each has a size of 6 bits. If the size of the codebook index is 3 bits, the best-N average codebook index and the whole band average codebook index (or the remaining band average codebook index) each has a size of 3 bits. If the size of the CQI is 5 bits, the whole band average CQI (or the remaining band average CQI) has a size of 5 bits. If the size of the differential CQI for one SB is 1 to 3 bits, the best-N differential CQI has a size of N*(1 to 3) bits.

(6) Sixth Embodiment

The MIMO information includes a best-N average codebook index (or a whole band average codebook index), a best-N average CQI (or a whole band average CQI), and an indication bitmap. The best-N average codebook index (or the whole band average codebook index) and the best-N average CQI (or the whole band average CQI) imply the following four cases: the best-N average codebook index and the best-N average CQI; the best-N average codebook index and the whole band average CQI; the whole band average codebook index and the best-N average CQI; and the whole band average codebook index and the whole band average CQI. N SBs are selected from a plurality of SBs constituting a WB. The average codebook index for the selected N SBs (or the average codebook index for the WB), the average CQI for the selected N SBs (or the average CQI for the WB), and the indication bitmap indicating the selected N SBs are transmitted. If the size of the codebook index is 6 bits, the best-N average codebook index (or the whole band average codebook index) has a size of 6 bits. If the size of the CQI is 5 bits, the best-N average CQI (or the whole band average CQI) has a size of 5 bits. If the WB is divided into 12 SBs, the indication bitmap has a size of 12 bits. Therefore, the size of the MIMO information is 23 bits.

(7) Seventh Embodiment

The MIMO information includes a best-N average codebook index (or a whole band average codebook index), a best-N average CQI, a whole band average CQI (or a remaining band average CQI), and an indication bitmap. The best-N average codebook index (or the whole band average codebook index) and the whole band average CQI (or the remaining band average CQI) imply the following four cases: the best-N average codebook index and the whole band average CQI; the best-N average codebook index and the remaining band average CQI; the whole band average codebook index and the whole band average CQI; and the whole band average codebook index and the remaining band average CQI. N SBs are selected from a plurality of SBs constituting a WB. The average codebook index for the selected N SBs (or the average codebook index for the WB), the average CQI for the selected N SBs, the average codebook index for the WB (or the average codebook index for SBs excluding the selected N SBs from the WB), and the indication bitmap indicating the selected N SBs are transmitted. If the size of the codebook index is 6 bits, the best-N average codebook index (or the whole band average codebook index) has a size of 6 bits. If the size of the CQI is 5 bits, the best-N average CQI and the whole band average CQI (or the remaining band average CQI) each has a size of 5 bits. If the WB is divided into 12 SBs, the indication bitmap has a size of 12 bits. Therefore, the size of the MIMO information is 28 bits.

(8) Eighth Embodiment

The MIMO information includes a whole band average CQI, a best-N average codebook index, a remaining band average codebook index, and an indication bitmap. N SBs are selected from a plurality of SBs constituting the WB. The average CQI for the WB, the average codebook index for the selected N SBs, the average codebook index for SBs excluding the selected N SBs from the WB, and the indication bitmap indicating the selected N SBs are transmitted. If the size of the codebook index is 3 bits, the best-N average codebook index and the remaining band average codebook index each has a size of 3 bits. If the size of the CQI is 5 bits, the whole band average CQI has a size of 5 bits. If the WB is divided into 12 SBs, the indication bitmap has a size of 12 bits. Therefore, the size of the MIMO information is 23 bits.

(9) Ninth Embodiment

The MIMO information includes a best-N average codebook index, a best-N average CQI, a whole band average CQI (or a remaining band average CQI), a whole band average codebook index (or a remaining band average codebook index), and an indication bitmap. The whole band average CQI (or the remaining band average CQI) and the whole band average codebook index (or the remaining band average codebook index) imply the four cases which are the same as those described in the third embodiment. N SBs are selected from a plurality of SBs constituting a WB. The average codebook index for the selected N SBs, the average CQI for the selected N SBs, the average CQI for the WB (or the average CQI for SBs excluding the selected N SBs from the WB), the average codebook index for the WB (or the average codebook index for SBs excluding the selected N SBs from the WB), and the indication bitmap indicating the selected N SBs are transmitted. If the size of the codebook index is 3 bits, the best-N average codebook index and the WB codebook index (or the remaining band average codebook index) each has a size of 3 bits. If the size of the CQI is 5 bits, the best-N average CQI and the whole band average CQI (or the remaining band average CQI) each has a size of 5 bits. If the WB is divided into 12 SBs, the indication bitmap has a size of 12 bits. Therefore, the size of the MIMO information is 28 bits.

(10) Tenth Embodiment

The MIMO information includes a best-N average CQI, a best-N differential CQI, a best-N average codebook index, and an indication bitmap. N SBs are selected from a plurality of SBs constituting a WB. The average CQI for the selected N SBs, the differential CQI for each of the selected N SBs, the average codebook index for the selected N SBs, and the indication bitmap indicating the selected N SBs are transmitted. If the size of the codebook index is 6 bits, the best-N average codebook index has a size of 6 bits and the best-N average CQI has a size of 5 bits. If the size of the differential CQI for one SB is 1 to 3 bits, the best-N differential CQI has a size of N*(1 to 3) bits. If the WB is divided into 12 SBs, the indication bitmap has a size of 12 bits.

Although an example of configuring the MIMO information has been described above for one feedback type, the MIMO information may be configured using two feedback types. This is shown in Table 2 below.

TABLE 2

| Feedback type | Feedback contents |
| --- | --- |
| 1110 | (Whole band average CQI(5 bits) or Remaining band average CQI(5 bits)) + Best-4 differential CQI(4*3 bits) + indication bitmap(12 bits) = 29 bits |
| 1111 | (Whole band average codebook index(6 bits) or Remaining band average codebook index(6 bits)) +Best-4 codebook index(4*6 bits) + Number of streams (2 bits) = 32 bits |

If the feedback type is '0b1110', a CQI is transmitted. If the feedback type is '0b1110', codebook index information is transmitted. For example, the CQI may be configured as a whole band average CQI (5 bits) or a remaining band average CQI (5 bits), a best-4 differential CQI (4*3 bits), and an indication bitmap (12 bits). The codebook index information may be configured as a whole band average codebook index (6 bits) or a remaining band average codebook index (6 bits), a best-4 codebook index (4*6 bits), and the number of streams (2 bits). In addition, the aforementioned types of feedback information may be combined.

Information included in the feedback message can be described as shown in Table 3 below. The number of bits shown in Table 3 is for exemplary purposes only, and the number of bits is not limited thereto.

TABLE 3

| No. | Type | Description | Bits |
| --- | --- | --- | --- |
| 1 | A | CL MIMO type | 2 |
| 2 | B | Whole band average CQI | 5 |

TABLE 3-continued

| No. | Type | Description | Bits |
| --- | --- | --- | --- |
| 3 | C | Best-N CQI or Best-N differential CQI | N * 5, or if indicated by a differential value with respect to a previous value or an average value, N * (1~4) |
| 4 | D | Best-N average CQI | 5 |
| 5 | E | Remaining band average CQI | 5 |
| 6 | F | Whole band average codebook index | 3 or 6 |
| 7 | G | Best-N codebook index | N * (3 or 6) |
| 8 | H | Best-N average codebook index | 3 or 6 |
| 9 | I | Remaining band average codebook index | 3 or 6 |
| 10 | J | Number of streams | 2 |
| 11 | K | Indication bitmap for Best-N band | 12 |

Information included in the feedback message may be used by combining the above types in various manners. For example, in the ninth embodiment, a format of H+D+(B or E)+(I or F)+K of Table 3 may be used. The aforementioned embodiments are for exemplary purposes only. The types of Table 3 may be combined to generate the feedback message in various formats by those who skilled in the art.

Figure 7:
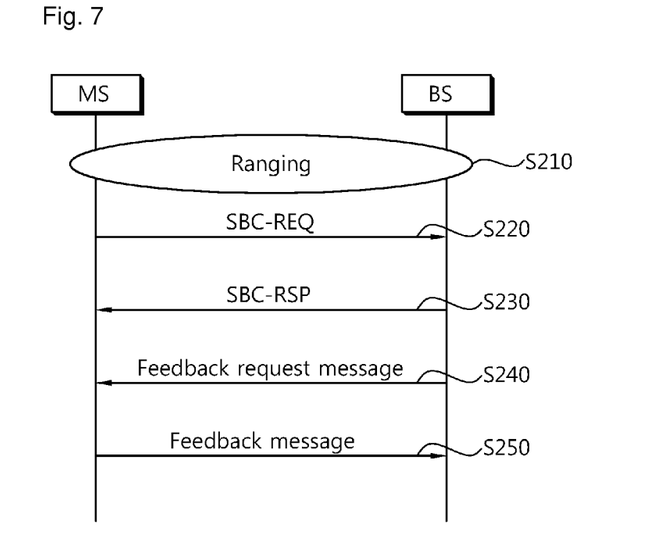
FIG. 7 is a flow diagram showing a method of transmitting a feedback message according to another embodiment of the present invention.

FIG. 7 is a flow diagram showing a method of transmitting a feedback message according to another embodiment of the present invention.

Referring to FIG. 7, ranging is performed between a BS and an MS (step S210). The ranging may be initial ranging or periodic raging. The initial ranging is a process which acquires an exact timing offset between the BS and the MS and regulates initial transmission power. The periodic ranging is a process which periodically tracks a UL timing offset and received signal strength after the initial ranging is performed.

The MS transmits an SS-basic capability request (SBC-REQ) to the BS (step S220). The SBC-REQ includes information regarding capability that can be supported by the MS for effective communication between the MS and the BS. Further, the SBC-REQ includes 'bandwidth allocation support' information and 'physical parameters supported' information. The 'physical parameters supported' information may include information regarding a variety of communication parameters, such as, a transmission interval of the MS, maximum transmit power, current transmit power, UL control channel support information, etc. The UL control channel support information indicates a control channel type supported in uplink transmission.

Table 4 shows an example of the 'UL control channel support' information.

TABLE 4

| Bit | Contents |
|---|---|
| #0 | 3-bit MIMO fast feedback |
| #1 | Enhanced fast feedback<br>Under negotiation for SBC fast feedback, if enhanced feature is enabled, the SS should use only the enhanced fast-feedback channel in the CQICH allocation IE |
| #2 | UL ACK |
| #3 | Reserved |
| #4 | UEP fast-feedback |
| #5 | A measurement report shall be performed on the last DL burst |
| #6 | Primary/Secondary fast-feedback |
| #7 | DIUC-CQI fast-feedback |

The description of Table 4 is not applied when a bit #n is '0', and is applied when the bit #n is '1'. A fast-feedback of MIMO information of a 3-bit payload is supported when a bit #0 is '1'. When a bit #1 is '1', a 6-bit payload fast-feedback, which is enhanced from a 3-bit payload fast-feedback, is supported in signaling of a CQI channel (CQICH). In this case, the MS uses a fast-feedback channel. A UL ACK channel is supported when a bit #2 is '1'. A bit #3 is reserved and is set to '0'. An unequal error protection (UEP) fast-feedback is supported when a bit #4 is '1'. The UEP fast-feedback is transmission in which each payload bit is repeatedly transmitted according to a defined repetition rate. A post-coding carrier-to-interference-and-noise ratio (CINR) measurement report for each spatial layer of a MIMO-supporting MS is formed on a DL burst when a bit #5 is '1'. A primary/secondary fast-feedback is supported when a bit #6 is '1'. The primary fast-feedback and the secondary fast-feedback are classified according to a method of mapping a feedback message to a tile. A downlink interval usage-code (DIUC)-CQI fast-feedback is supported when a bit #7 is '1'.

The BS transmits an SS-basic capabilities response (SBC-RSP) to the MS (step S230). The SBC-RSP is a response for the SBC-REQ and indicates capability to be applied to the communication between the MS and the BS. Capability negotiation between the MS and the BS is performed by using the SBC-REQ and the SBC-RSP. When a certain function is set to 'on' in the SBC-REQ, the function may be set to 'on' or 'off' in the SBC-RSP in transmission. A function which is set to 'on' in both the SBC-REQ and the SBC-RSP is applied to the communication between the MS and the BS.

Now, a case where 'Primary/Secondary fast_feedback' is '"' through the SBC-REQ/RSP, and thus primary/secondary fast feedbacks are used in communication between the MS and the BS will be described.

The BS transmits a feedback request message to the MS (step S240). To indicate a method of transmitting a feedback message, the feedback request message may include an uplink radio resource allocation and a feedback type. The uplink radio resource allocation is information on a CQICH Identifier (CQICH ID), a feedback message transmission period, a frame offset, a fast feedback channel type, etc. The CQICH ID is an identifier for identifying a fast feedback channel allocated to the MS. The fast feedback channel type indicates a type of the fast feedback channel to be used when the MS reports the feedback message. The feedback type indicates a type of the feedback message to be reported by the MS. For example, the feedback request message may be a CQICH allocation message, a CQICH enhanced allocation message, etc.

The CQICH allocation message or the CQICH enhanced allocation message may be used to allocate the primary fast feedback channel and/or the secondary fast feedback channel to the MS. The CQICH allocation message or the CQICH enhanced allocation message is included in the UL-MAP message when transmitted.

The CQICH allocation message will be first described. The CQICH allocation message may include a fast feedback channel type field, a MIMO permutation feedback cycle field, or a simultaneous transmit indication field.

If the CQICH allocation message includes the fast feedback channel type field, the fast feedback channel type field indicates a fast feedback channel type. Examples of the fast feedback channel type include a primary fast feedback channel, a secondary fast feedback channel, a primary plus secondary fast feedback channel, etc. The primary plus secondary fast feedback channel indicates the use of both the primary fast feedback channel and the secondary fast feedback channel. Upon receiving the CQICH allocation message, the MS transmits the feedback message through the fast feedback channel indicated by the fast feedback channel type field.

If the CQICH allocation message includes the MIMO permutation feedback cycle field, the MIMO permutation feedback cycle field may indicate the use of both the primary fast feedback channel and the secondary fast feedback channel. Upon receiving the CQICH allocation message, the MS transmits a MIMO permutation feedback indication indicated by the MIMO permutation feedback cycle field. Table 5 below shows an example of the MIMO permutation feedback cycle field.

TABLE 5

| Syntax | Size (bit) | Notes |
|---|---|---|
| MIMO_permutation_feedback_cycle | 2 | 0b00 = No MIMO and permutation mode feedback<br>0b01 = The MIMO and permutation mode indication shall be transmitted on the CQICH indexed by the CQICH_ID every four allocated CQICH transmission opportunity. The first indication is sent on the fourth allocated CQICH transmission opportunity.<br>0b10 = The MIMO mode and permutation mode indication shall be transmitted on the CQICH indexed by the CQICH_ID every eight allocated CQICH transmission opportunity. The first indication is sent on the eight allocated CQICH transmission opportunity.<br>0b11 = The MIMO mode and permutation mode indication shall be transmitted on the |

TABLE 5-continued

| Syntax | Size (bit) | Notes |
|---|---|---|
| | | secondary CQICH indexed by the CQICH_ID with CQI on primary CQICH simultaneously. |

If the MIMO permutation feedback cycle field is '0b00', there is no MIMO and permutation mode feedback. If the MIMO permutation feedback cycle field is '0b01', a MIMO and permutation mode indication is transmitted for every four CQICHs through a CQICH indexed by the CQICH ID. If the MIMO permutation feedback cycle field is '0b10', the MIMO and permutation mode indication is transmitted for every eight CQICHs through a CQICH indexed by the CQICH ID. If the MIMO permutation feedback cycle field is '0b11', the MS transmits the feedback message by using the primary fast feedback channel and the secondary fast feedback channel. For example, the MIMO and permutation mode indication is transmitted through the secondary fast feedback channel indexed by the CQICH ID, and at the same time, the CQI is transmitted through the primary feedback channel.

If the CQICH allocation message includes the simultaneous transmit indication field, the simultaneous transmit indication field is indicated to use the primary fast feedback channel and the secondary fast feedback channel. Table 6 below shows an example of the simultaneous transmit indication field.

TABLE 6

| Syntax | Size (bit) | Notes |
|---|---|---|
| simultaneous transmit indication | 1 | 0b0 = None. 0b1 = The MIMO mode and permutation mode indication shall be transmitted on the secondary CQICH indexed by the CQICH_ID with CQI on primary CQICH simultaneously. |

If the simultaneous transmit indication field is '0b0', no operation is performed. If the simultaneous transmit indication field is '0b1', the MS transmits the feedback message by using the primary fast feedback channel and the secondary feedback channel. For example, the MIMO and permutation mode indication is transmitted on the secondary fast feedback channel indexed by the CQICH ID, and at the same time, the CQI is transmitted on the primary feedback channel.

Now, the CQICH enhanced allocation message will be described.

The CQICH enhanced allocation message may include a CQICH type field. The CQICH type field indicates a fast feedback channel type. Examples of the fast feedback channel type include a primary fast feedback channel, a secondary fast feedback channel, a primary plus secondary fast feedback channel, etc. The primary plus secondary fast feedback channel indicates the use of both the primary fast feedback channel and the secondary fast feedback channel. Table 7 below shows an example of the CQICH type.

TABLE 7

| Syntax | Size (bit) | Notes |
|---|---|---|
| CQICH Type | 3 | 0b000: 6-bit CQI 0b001: Reserved 0b010: 3-bit CQI (even) 0b011: 3-bit CQI (odd) 0b100: 6-bit CQI (primary) |

TABLE 7-continued

| Syntax | Size (bit) | Notes |
|---|---|---|
| | | 0b101: 4-bit CQI (secondary) 0b110: 6-bit CQI (primary) + 4-bit CQI (secondary) 0b111: Reserved |

If the CQICH type is '0b000', the MS transmits a 6-bit feedback message on the enhanced fast feedback. If the CQICH type is '0b010', the MS transmits a 3-bit feedback message on even tiles of the enhanced fast feedback. If the CQICH type is '0b011', the MS transmits a 3-bit feedback message on odd tiles of the enhanced fast feedback. If the CQICH type is '0b100', the MS transmits a 6-bit feedback message on the primary fast feedback channel. If the CQICH type is '0b101', the MS transmits a 4-bit feedback message on the secondary fast feedback channel. If the CQICH type is '0b110', the MS transmits a feedback message on the primary fast feedback channel and on the secondary fast feedback channel. That is, a 6-bit first feedback message is transmitted on the primary fast feedback channel, and at the same time, a 4-bit second feedback message is transmitted on the secondary fast feedback channel. '6-bit CQI(primary)+4-bit CQI (secondary)' may be indicated by a reserved '0b001' or '0b111'.

The MS transmits the feedback message to the BS (step S250).

The MS transmits the feedback message on the fast feedback channel allocated by the feedback request message.

If the primary plus secondary fast feedback channel is allocated using the CQICH allocation message or the CQICH enhanced message, the MS transmits the first feedback message on the primary fast feedback channel, and simultaneously transmits the second feedback message on the secondary fast feedback channel.

The type of the first feedback message and/or the second feedback message may be determined by the BS or may be determined using a preliminary rule between the BS and the MS. For example, the CQICH allocation message or the CQICH enhanced allocation message may include a feedback type that indicates the type of the first feedback message and/or the second feedback message.

Examples of the first feedback message may include a BR that requests bandwidth allocation, a CQI that indicates downlink channel quality, MIMO information, etc. For example, the first feedback message may be a best-N CQI or a best-N differential CQI. In addition, the first feedback message may be a best-N codebook index.

Examples of the second feedback message may include MIMO information (e.g., an average CQI and an average codebook index), a MIMO and permutation mode indication, a BR, etc. The average CQI may be a best-N average CQI, a whole band average CQI (or a remaining band average CQI), etc. In addition, the average codebook index may be a best-N average codebook index, a whole band average codebook index (or a remaining band average codebook index), etc.

The first feedback message and the second feedback message can be combined variously. First, the CQI can be transmitted using the first feedback message, and at the same time, the MIMO and permutation mode indication can be transmitted using the second feedback message. Second, the best-N CQI can be transmitted using the first feedback message, and at the same time, the average CQI can be transmitted using the second feedback message. Third, the best-N differential CQI can be transmitted using the first feedback message, and at the same time, the average CQI can be transmitted using the second feedback message. Fourth, the best-N codebook index can be transmitted using the first feedback message, and at the same time, the average codebook index can be transmitted using the second feedback message. Fifth, the CQI or the MIMO information can be transmitted using the first feedback message, and the BR can be transmitted using the second feedback message.

The aforementioned combinations are for exemplary purposes only, and thus the first feedback message and the second feedback message can be combined in various manners by those skilled in the art when necessary.

The first feedback message is transmitted on the primary fast feedback channel. The primary fast feedback channel may be mapped to one subchannel including six tiles. As shown in FIG. 4, when using the PUSC permutation, one tile includes eight data subcarriers and four pilot subcarriers. The first feedback message is mapped to eight data subcarriers of each tile. Table 8 below shows an example of modulation symbols carried on the eight data subcarriers of each tile.

TABLE 8

| Vector index | Data subcarrier modulation per Code word Subcarrier(0), Subcarrier(1), ... Subcarrier(7) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

$M_{n,8m+k}(0 \leq k \leq 7)$ denotes an index of a kth modulation symbol in an mth uplink PUSC tile of an nth primary fast feedback channel. The modulation symbol is modulated to one subcarrier. Eight modulation symbols carried on one tile constitute one vector. A total of 8 types of vectors are constituted. An index of each vector is in the range of 0 to 7.

The modulation symbols constituting each vector are expressed by Equation 1 below.

Math Figure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

Vectors having different indices are orthogonal to each other.

Table 9 below shows an example of a vector allocated to the primary fast feedback channel when the first feedback message is represented with a 6-bit payload.

TABLE 9

| 6-bit Payload (binary) | Fast-feedback vector indices per Tile Tile(0), Tile(1), ... Tile(5) |
| --- | --- |
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |
| 111101 | 4, 7, 1, 6, 3, 2 |
| 111110 | 7, 4, 2, 5, 0, 1 |
| 111111 | 6, 5, 3, 4, 1, 0 |

The primary fast feedback channel is mapped to one subchannel including six tiles. Thus, one vector is required to express one tile, and six vectors are required to express the first feedback message.

The second feedback message is transmitted on the secondary fast feedback channel. The secondary fast feedback channel may be mapped to one subchannel including six tiles. In this case, the secondary fast feedback channel may be a subchannel different from the primary fast feedback channel.

When using the PUSC permutation, the second feedback message is mapped to four pilot subcarriers of each tile. Table 10 below shows an example of modulation symbols carried on the four pilot subcarriers of each tile.

TABLE 10

| Vector index | $M_{n,4m}$, $M_{n,4m-1}$, $M_{n,4m+2}$, $M_{n,4m-3}$ |
|---|---|
| 0 | P0, P0, P0, P0 |
| 1 | P0, P2, P0, P2 |
| 2 | P0, P1, P2, P3 |
| 3 | P1, P0, P3, P2 |

$M_{n,4m+k}$ (0≤k≤3) denotes an index of a kth modulation symbol in an mth uplink PUSC tile of an nth secondary fast feedback channel. The modulation symbol is modulated to one subcarrier. Four modulation symbols carried on one tile constitute one vector. A total of 4 types of vectors are constituted. An index of each vector is in the range of 0 to 3.

The modulation symbols constituting each vector are expressed by Equation 1 above. Vectors having different indices are orthogonal to each other.

Table 11 below shows an example of a vector allocated to the secondary fast feedback channel when the second feedback message is represented with a 4-bit payload.

TABLE 11

| Four-bit payload (binary) | Vector indices per tile Tile(0), Tile(1), Tile(2), Tile(3), Tile(4), Tile(5) |
|---|---|
| 0000 | 0, 0, 0, 1, 1, 1 |
| 0001 | 1, 1, 1, 0, 0, 0 |
| 0010 | 2, 2, 2, 3, 3, 3 |
| 0011 | 3, 3, 3, 2, 2, 2 |
| 0100 | 0, 1, 2, 3, 0, 1 |
| 0101 | 1, 2, 3, 0, 1, 3 |
| 0110 | 2, 3, 0, 1, 2, 3 |
| 0111 | 3, 0, 1, 2, 3, 0 |
| 1000 | 0, 0, 1, 3, 2, 2 |
| 1001 | 1, 3, 2, 2, 3, 1 |
| 1010 | 2, 2, 3, 1, 0, 0 |
| 1011 | 3, 3, 1, 0, 1, 1 |
| 1100 | 0, 0, 3, 2, 0, 3 |
| 1101 | 1, 2, 0, 2, 2, 0 |
| 1110 | 2, 1, 3, 3, 1, 2 |
| 1111 | 3, 2, 2, 1, 1, 2 |

The secondary fast feedback channel is mapped to one subchannel including six tiles. Thus, one vector is required to express one tile, and six vectors are required to express the second feedback message.

The vectors shown in Table 8 and Table 10 according to each index and the vector combinations based on a payload indicating the feedback messages of Table 9 and Table 11 are for exemplary purposes only. Thus, there is no limit in the vector combination, and the number of vector indices or the size of the payload can be easily modified by those skilled in the art.

For example, if the 4-bit payload is used as shown in Table 11, 16 codewords are possible. In this case, a 17th codeword which is far in distance from the 16 codewords can be added. The 17th codeword can be used when the second feedback message is the BR. Then, similarly to the primary fast feedback channel capable of transmitting the CQI, the MIMO information, or the BR, the secondary fast feedback channel can also transmit all of these information elements. Therefore, the number of combinations of simultaneously transmittable information elements increases. That is, if the BR is required while the first feedback message transmits the CQI or the MIMO information and the second feedback message transmits the average CQI, the first feedback message can transmit the CQI or the MIMO information and the second feedback message can transmit the BR. In addition thereto, various combinations are also possible when necessary.

Figure 8:
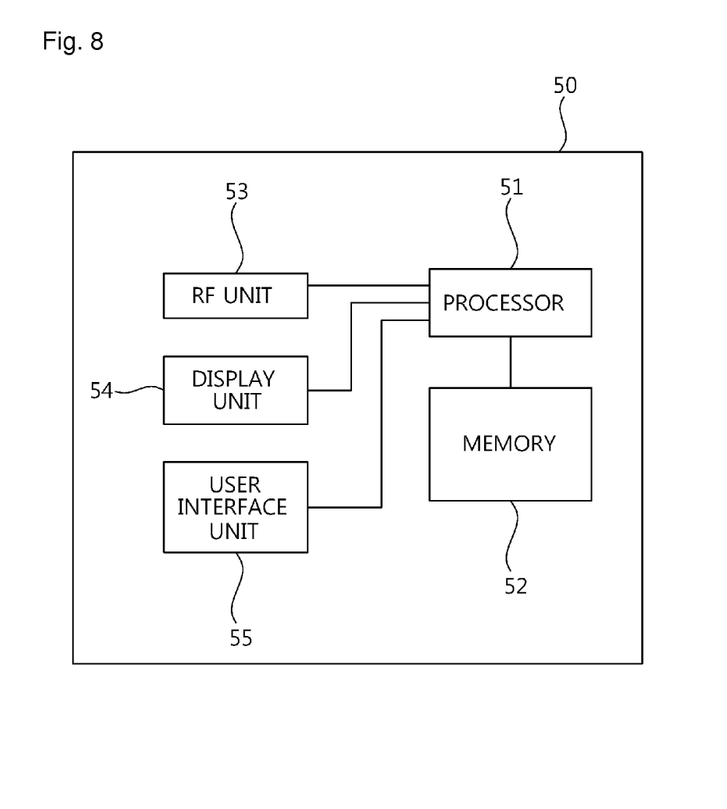
FIG. 8 is a block diagram showing an apparatus for wireless communication.

FIG. 8 is a block diagram showing an apparatus for wireless communication. The apparatus for wireless communication may be a part of a MS. The apparatus 50 includes a processor 51, memory 52, a Radio Frequency (RF) unit 53, a display unit 54 and a user interface unit 55. The memory 52 is coupled to the processor 51 and stores a set of available ranging codes and MS status information. The display unit 54 displays a variety of information and may use a well-known element, such as an LCD (Liquid Crystal Display) or OLED (Organic Light Emitting Diode). The user interface unit 55 may be configured with a combination of well-known user interfaces such as a keypad and a touch screen. The RF unit 53 is coupled to the processor 51 and transmits and/or receives radio signals. The processor 51 is configured to perform transmitting a feedback message. The methods described above may be implemented in the processor 51.

Accordingly, a feedback message can be effectively transmitted by combining different types of channel information, thereby reducing overhead. In addition, transmission efficiency can be improved since a feedback message combined with a variety of channel information can be transmitted when necessary.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a feedback message through a feedback header, the method comprising:
receiving a feedback request message comprising a feedback type field; and
transmitting a feedback header as a response to the feedback request message,
wherein the feedback header has a format comprising the feedback type field and a feedback contents field,
wherein a value of the feedback type field indicates a type of information contained in the feedback contents field, and
wherein when the value of feedback type field indicates a closed-loop (CL) multiple input multiple output (MIMO) feedback, the feedback contents field comprises a CL MIMO type field and MIMO information, the CL MIMO type field indicating any one of an antenna grouping, an antenna selection, a codebook based feedback and transition from CL MIMO to open-loop MIMO, and wherein when the CL MIMO type indicates the codebook based feedback, the MIMO information comprises N codebook indexes and N differential CQIs, wherein the N codebook indexes indicate codebooks used for N best subbands of M subbands according to channel quality indicator (CQI), where both M and N are natural numbers and M is larger than N, and each of the N differential CQIs indicates difference between a reference CQI and a CQI for each of the N best subbands.

2. The method of claim 1, wherein the feedback type field comprises 4 bits.

3. The method of claim 1, wherein the CL MIMO type field comprises 2 bits.

4. The method of claim 1, wherein the reference CQI is transmitted before the feedback message is transmitted.

5. The method of claim 1, wherein a bit-size of the feedback contents field is 16 bits or 32 bits.

6. The method of claim 1, wherein the feedback request message further comprises an uplink radio resource allocation used to transmitting the feedback header.

7. The method of claim 1, wherein the feedback request message is a feedback polling message transmitted on an uplink (UL)-MAP.

8. A mobile station (MS) comprising:
 a radio frequency (RF) unit for transmitting and receiving a radio signal; and
 a processor coupled with the RF unit and configured to
 receive a feedback request message comprising a feedback type field; and
 transmit a feedback header as a response to the feedback request message,
 wherein the feedback header has a format comprising the feedback type field and a feedback contents field, wherein a value of the feedback type field indicates a type of information contained in the feedback contents field, and
 wherein when the value of feedback type field indicates a closed-loop (CL) multiple input multiple output (MIMO) feedback, the feedback contents field comprises a CL MIMO type field indicating any one of an antenna grouping, an antenna selection, a codebook based feedback and transition from CL MIMO to open-loop MIMO, and
 wherein when the CL MIMO type indicates the codebook based feedback, the MIMO information comprises N codebook indexes and N differential CQIs, wherein the N codebook indexes indicate codebooks used for N best subbands of M subbands according to channel quality indicator (CQI), where both M and N are natural numbers and M is larger than N, and each of the N differential CQIs indicates difference between a reference CQI and a CQI for each of the N best subbands.

\* \* \* \* \*